US012646735B2

(12) United States Patent
Kim et al.

(10) Patent No.: US 12,646,735 B2
(45) **Date of Patent: *Jun. 2, 2026**

(54) SECONDARY BATTERY AND METHOD FOR MANUFACTURING THE SAME

(71) Applicant: LG Energy Solution, Ltd., Seoul (KR)

(72) Inventors: Jae Woong Kim, Daejeon (KR);
Hyoung Kwon Kim, Daejeon (KR);
Sang Uck Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/313,233

(22) Filed: Aug. 28, 2025

(65) Prior Publication Data

US 2025/0385292 A1      Dec. 18, 2025

Related U.S. Application Data

(63) Continuation of application No. 19/207,758, filed on May 14, 2025, which is a continuation of application
(Continued)

(30) Foreign Application Priority Data

Apr. 14, 2017   (KR) ........................ 10-2017-0048645
Apr. 13, 2018   (KR) ........................ 10-2018-0043191

(51) Int. Cl.
*H01M 10/04*        (2006.01)
*H01M 50/538*       (2021.01)
*H01M 50/536*       (2021.01)

(52) U.S. Cl.
CPC ...  *H01M 10/0422* (2013.01); *H01M 10/0431* (2013.01); *H01M 50/538* (2021.01); *H01M 50/536* (2021.01)

(58) Field of Classification Search
CPC ............. H01M 50/531; H01M 50/538; H01M 10/0422
See application file for complete search history.

(56) References Cited

U.S. PATENT DOCUMENTS

| | | | |
|---|---|---|---|
| 3,761,314 A | 9/1973 | Cailley | |
| 4,822,377 A | 4/1989 | Wolff | |

(Continued)

FOREIGN PATENT DOCUMENTS

| | | |
|---|---|---|
| CN | 101714624 A | 5/2010 |
| CN | 201450072 U | 5/2010 |

(Continued)

OTHER PUBLICATIONS

Chinese Search Report for Application No. 201880025247, dated Aug. 24, 2021, 2 pages.

(Continued)

*Primary Examiner* — Alix E Eggerding
(74) *Attorney, Agent, or Firm* — Lerner David LLP

(57) ABSTRACT

The present invention relates to a secondary battery in which an electrode tab is improved in mechanical strength and a method for manufacturing the same. Also, the secondary battery according to the present invention includes: an electrode provided with a coating portion coated with an active material on an electrode collector and a non-coating portion on which the active material is not applied to the electrode collector in a longitudinal direction of the electrode collector and a notching tab part extending from the coating portion in a width direction of the electrode collector without coating with the active material and overlapping each other to form two or more layers when the electrode is wound.

18 Claims, 9 Drawing Sheets

Related U.S. Application Data

No. 18/620,269, filed on Mar. 28, 2024, now Pat. No. 12,334,493, which is a continuation of application No. 18/618,609, filed on Mar. 27, 2024, now Pat. No. 12,341,147, which is a continuation of application No. 18/132,719, filed on Apr. 10, 2023, now Pat. No. 11,973,177, which is a continuation of application No. 16/498,751, filed as application No. PCT/KR2018/004366 on Apr. 13, 2018, now Pat. No. 11,652,232.

(56) References Cited

U.S. PATENT DOCUMENTS

| | | | |
|---|---|---|---|
| 6,569,565 | B2 | 5/2003 | Ligeois et al. |
| 11,652,232 | B2 | 5/2023 | Kim et al. |
| 11,973,177 | B2 | 4/2024 | Kim et al. |
| 12,334,493 | B2 * | 6/2025 | Kim .................. H01M 10/0422 |
| 2001/0023038 | A1 * | 9/2001 | Ligeois ............... H01M 50/528 |
| | | | 429/178 |
| 2005/0003264 | A1 | 1/2005 | Oh et al. |
| 2005/0142436 | A1 | 6/2005 | Arai et al. |
| 2005/0277022 | A1 | 12/2005 | Kozuki |
| 2005/0287428 | A1 | 12/2005 | Cheon et al. |
| 2005/0287432 | A1 | 12/2005 | Cheon et al. |
| 2006/0024572 | A1 | 2/2006 | Lee |
| 2006/0127774 | A1 | 6/2006 | Kim et al. |
| 2007/0196730 | A1 | 8/2007 | Kozuki |
| 2010/0081052 | A1 | 4/2010 | Morishima et al. |
| 2010/0190056 | A1 | 7/2010 | Turner |
| 2010/0310926 | A1 | 12/2010 | Wang et al. |
| 2011/0067227 | A1 | 3/2011 | Sohn |
| 2011/0293977 | A1 | 12/2011 | Kim et al. |
| 2012/0009450 | A1 | 1/2012 | Chun |
| 2012/0208055 | A1 | 8/2012 | Ahn |
| 2013/0108903 | A1 | 5/2013 | Martin et al. |
| 2013/0252054 | A1 | 9/2013 | Barone et al. |
| 2013/0344364 | A1 | 12/2013 | Nanaumi et al. |
| 2014/0050956 | A1 | 2/2014 | Huang |
| 2015/0295270 | A1 | 10/2015 | Chun |
| 2016/0351966 | A1 | 12/2016 | Batson et al. |
| 2018/0145304 | A1 | 5/2018 | Kogetsu et al. |
| 2019/0379028 | A1 | 12/2019 | Lim et al. |
| 2024/0243335 | A1 | 7/2024 | Kim et al. |

FOREIGN PATENT DOCUMENTS

| | | | |
|---|---|---|---|
| CN | 102024936 | A | 4/2011 |
| CN | 203250828 | U | 10/2013 |
| CN | 204577523 | U | 8/2015 |
| EP | 1134820 | A1 | 9/2001 |
| JP | H0935701 | A | 2/1997 |
| JP | H11339756 | A | 12/1999 |
| JP | 2000-077078 | A | 3/2000 |
| JP | 2000-228182 | A | 8/2000 |
| JP | 2003338276 | A | 11/2003 |
| JP | 2005276459 | A | 10/2005 |
| JP | 2006128106 | A | 5/2006 |
| JP | 2006-324049 | A | 11/2006 |
| JP | 2007227137 | A | 9/2007 |
| JP | 2008066040 | A | 3/2008 |
| JP | 4401634 | B2 | 1/2010 |
| JP | 2011065981 | A | 3/2011 |
| JP | 5117133 | B2 | 1/2013 |
| JP | 5790576 | B2 | 10/2015 |
| JP | 2016001575 | A | 1/2016 |
| JP | 6045286 | B2 | 12/2016 |
| JP | 2020509534 | A | 3/2020 |
| KR | 20000051740 | A | 8/2000 |
| KR | 100515833 | B1 | 9/2005 |
| KR | 20050121904 | A | 12/2005 |
| KR | 20050121914 | A | 12/2005 |
| KR | 20060022358 | A | 3/2006 |
| KR | 100599710 | B1 | 7/2006 |
| KR | 100599749 | B1 | 7/2006 |
| KR | 20100071941 | A | 6/2010 |
| KR | 20120006389 | A | 1/2012 |
| KR | 20120092367 | A | 8/2012 |
| KR | 20130073329 | A | 7/2013 |
| KR | 20150117135 | A | 10/2015 |
| KR | 2016-0009406 | A | 1/2016 |
| KR | 20160113612 | A | 9/2016 |
| KR | 20170006437 | A | 1/2017 |
| WO | 2012086690 | A1 | 6/2012 |
| WO | 2014188501 | A1 | 11/2014 |

OTHER PUBLICATIONS

Extended European Seach Report including Written Opinion for Application No. 24187569.9 dated Oct. 11, 2024. 9 pages.
Extended European Seach Report including Written Opinion for Application No. 24187669.7 dated Oct. 18, 2024. 9 pages.
Extended European Seach Report including Written Opinion for Application No. EP18784869.2 dated Jan. 21, 2020, 5 pages.
International Search Report from Application No. PCT/KR2018/004366 mailed Jul. 20, 2018, pp. 1-2.

* cited by examiner

PREPARATION STEP ~S1

NOTCHING TAB PART
FORMATION STEP ~S2

WINDING STEP ~S3

NOTCHING TAB
FORMATION STEP ~S4

INSTALLATION STEP ~S5

SECONDARY BATTERY AND METHOD FOR MANUFACTURING THE SAME

CROSS-REFERENCE TO RELATED APPLICATIONS

This application is a continuation of U.S. application Ser. No. 19/207,758, filed on May 14, 2025, which is a continuation of U.S. patent application Ser. No. 18/620,269, filed on Mar. 28, 2024, now U.S. Pat. No. 12,334,493, which is a continuation of U.S. patent application Ser. No. 18/618,609, filed on Mar. 27, 2024, now U.S. Pat. No. 12,341,147, which is a continuation of U.S. application Ser. No. 18/132,719, filed on Apr. 10, 2023, now U.S. Pat. No. 11,973,177, which is a continuation of U.S. application Ser. No. 16/498,751, filed on Sep. 27, 2019, now U.S. Pat. No. 11,652,232, which is a national phase entry under 35 U.S.C. § 371 of International Application No. PCT/KR2018/004366, filed on Apr. 13, 2018, which claims priority from Korean Patent Application Nos. 10-2017-0048645, filed on Apr. 14, 2017, and 10-2018-0043191, filed on Apr. 13, 2018, the disclosures of all of which are hereby incorporated by reference herein in their entireties.

TECHNICAL FIELD

The present invention relates to a secondary battery and a method for manufacturing the same, and more particularly, to a secondary battery in which an electrode tab increases in mechanical strength and a method for manufacturing the same.

BACKGROUND ART

Batteries (cells) that generate electric energy through physical or chemical reaction to supply the generated electric energy to the outside are used when AC power to be supplied to the building is not obtained, or DC power is required according to the living environments surrounded by various electric and electronic devices.

Among such batteries, primary batteries and secondary batteries, which are chemical batteries using chemical reaction, are being generally used. The primary batteries are consumable batteries which are collectively referred to as dry batteries. Also, secondary batteries are rechargeable batteries that are manufactured by using a material in a redox process between current and a substance is repeatable several times. When the reduction reaction is performed on the material by the current, power is charged, and when the oxidation reaction is performed on the material, power is discharged. Such the charging-discharging is repeatedly performed to generate electricity.

A lithium ion battery of the secondary batteries is manufactured through the following processes. An active material is applied to each of a positive electrode conductive foil and a negative electrode conductive foil at a predetermined thickness, and a separator is disposed between the positive electrode conductive foil and the negative electrode conductive foil, and then, an electrode assembly, in which the positive electrode conductive foil, the separator, and the negative electrode conductive foil are wound several times in a jelly-roll or cylindrical shape, is accommodated into a cylindrical or prismatic can, a pouch, and the like to seal the resultant product, thereby manufacturing the lithium ion battery.

An electrode assembly and a secondary battery including the same according to the related art is disclosed in Korea Patent Publication No. 10-2012-0006389.

In the secondary battery according to the related art, it is necessary to apply a technology in which a metal having low resistance is applied to a negative electrode tab, or the number of electrode tabs increases in order to develop a low resistance cell.

A negative multi-tab structure developed by this necessity was a two-tab structure in which an electrode tab is attached to each of a core and an outer portion or a three-tab structure in which an electrode tab is applied to each of a core and an outer portion, and a middle tab is attached to an intermediate portion.

However, in order to attach the middle tab on the characteristics of the jelly roll, a non-coating portion has to be formed on a predetermined portion in the middle of the electrode. Thus, there is a problem that the battery capacity is lowered due to an increase of the non-coating portion.

DISCLOSURE OF THE INVENTION

Technical Problem

Therefore, the present invention has been made to solve the abovementioned problem, and an object of the prevent invention is to provide a secondary battery in which a multi-tab is formed while minimizing a non-coating portion and a method for manufacturing the same.

Also, an object of the present invention is to provide a secondary battery which is capable of increasing in mechanical strength while notching electrode foil to form an electrode tab and a method for manufacturing the same.

Technical Solution

A secondary battery according to an embodiment of the present invention includes: an electrode provided with a coating portion coated with an active material on an electrode collector and a non-coating portion on which the active material is not applied to the electrode collector in a longitudinal direction of the electrode collector; and a notching tab part extending from the coating portion in a width direction of the electrode collector perpendicular to the longitudinal direction and not coated with the active material, the notching tab part having a wound state including two or more overlapping layers when the electrode is in a wound state.

The notching tab part may continuously extend across $\frac{1}{3}$ or more of a total length of the coating portion in the longitudinal direction.

When the electrode is in the wound state, the notching tab part may form a plurality of notching tabs.

The foil tab may have a width of 4 mm to 120 mm.

The electrode may be accommodated in a can member, and each of the plurality of notching tabs may be in a bent state and may be connected to the can member.

A bent part formed by bending each of the plurality of notching tabs may be bonded to the can member.

The secondary battery may further include an insulation member disposed between the bent parts and an end of the electrode.

The secondary battery may further include an electrode tab attached to the non-coating portion.

When the electrode is in the wound state, the notching tab part may form a plurality of notching tabs, and the electrode may be accommodated in a can member, and each of the plurality of notching tabs may be in a bent state and may overlap the electrode tab.

The electrode tab and the plurality of notching tabs may be bonded together to the can member.

A method for manufacturing a secondary battery according to an embodiment of the present invention includes: a preparation step of preparing an electrode provided with a coating portion coated with an active material on an electrode collector and a non-coating portion on which the active material is not applied to the electrode collector in a longitudinal direction of the electrode collector; a notching tab part formation step of notching the electrode to form a notching tab part not coated with the active material and extending from the coating portion in a width direction of the electrode collector perpendicular to the longitudinal direction, the notching tab part extending across ⅓ or more of a total length of the coating portion in the longitudinal direction; a winding step including stacking the electrode with a separator and with another electrode having a polarity different from that of the electrode and winding the electrode, the separator, and the another electrode to form an electrode assembly; a notching tab formation step of cutting the notching tab part of the electrode assembly to form a plurality of notching tabs; and an installation step of accommodating the electrode assembly into a can member and bonding each of the plurality of notching tabs to the can member.

The electrode may be a negative electrode.

During the preparation step, the coating portion coated with the active material on the electrode collector and the non-coating portion on which the active material is not applied may be arranged in parallel to each other in the width direction of the electrode collector.

during the notching tab part formation step, the notching tab part on which the active material is not applied may be notched in the width direction of the coating portion while cutting the coating portion and the non-coating portion in the longitudinal direction of the electrode collector.

During the notching tab part formation step, notching may be performed so that the notching tab part on which the active material is not applied is notched in the width direction of the coating portion while cutting the electrode.

During the notching tab formation step, the notching tab part may be cut using a laser.

During the installation step, the electrode assembly may be accommodated in the can member in a state in which the plurality of notching tabs are bent and bonded to the can member.

During the installation step, a bent portion of each of the plurality of notching tabs may be welded to the can member.

During the installation step, bent portions of each of the plurality of notching tabs may overlap each other and may be bonded to the can member together.

During the winding step, the notching tab part may be wound to form two or more overlapping layers.

Advantageous Effects

According to the present invention, the multi-tab may be formed while minimizing the formation of the non-coating portion.

According to the present invention, the multi-tab may be formed to minimize the electric resistance.

According to the present invention, the formation of the non-coating part may be minimized to secure the battery capacity.

According to the present invention, the notching tab may overlap each other to form two or more layers while forming the notching tab that is the foil tab from the electrode foil, whereby increasing in mechanical strength.

According to the present invention, the notching tab that is the foil tab may increase in mechanical strength to prevent the notching tab from being broken in the bent state, and thus, the notching tab may be boned to the can member in the bent state to secure the reliability in electrical connection and improve the bonding performance.

According to the present invention, the notching tab and the electrode tab may be bonded to the can member at the same to secure the welding processability.

According to the present invention, the plurality of notching tabs may be formed outside the electrode assembly to install the insulation member between the plurality of notching tabs and the end of the electrode assembly, and thereby to prevent the notching tabs and the electrode assembly from coming into contact with each other, thereby improving the safety.

MODE FOR CARRYING OUT THE INVENTION

Figure 1:
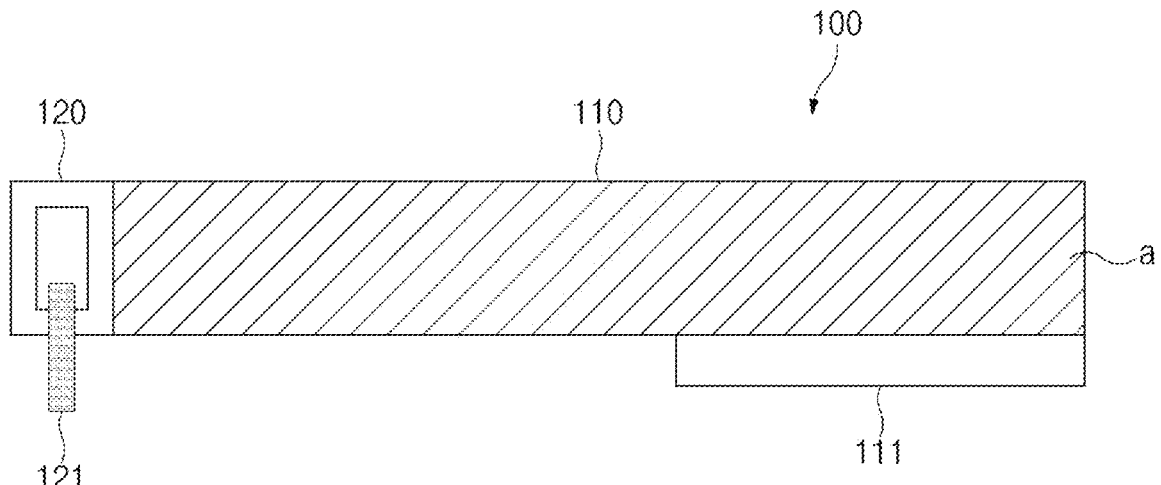
FIG. 1 is a development view of an electrode according to an embodiment of the present invention.

Hereinafter, a secondary battery and a method for manufacturing the same according to exemplary embodiments of the present invention will be described in detail with reference to the accompanying drawings.

Terms or words used in the specification and claims should not be construed as limited to a lexical meaning, and should be understood as appropriate notions by the inventor based on that he/she is able to define terms to describe his/her invention in the best way to be seen by others. Therefore, embodiments and drawings described herein are simply exemplary and not exhaustive, and it will be understood that various equivalents may be made to take the place of the embodiments.

In the drawings, the dimension of each of components or a specific portion constituting the component is exaggerated, omitted, or schematically illustrated for convenience in description and clarity. Thus, the dimension of each element does not entirely reflect an actual size. Moreover, detailed descriptions related to well-known functions or configurations will be ruled out in order not to unnecessarily obscure subject matters of the present invention.

Figure 2:
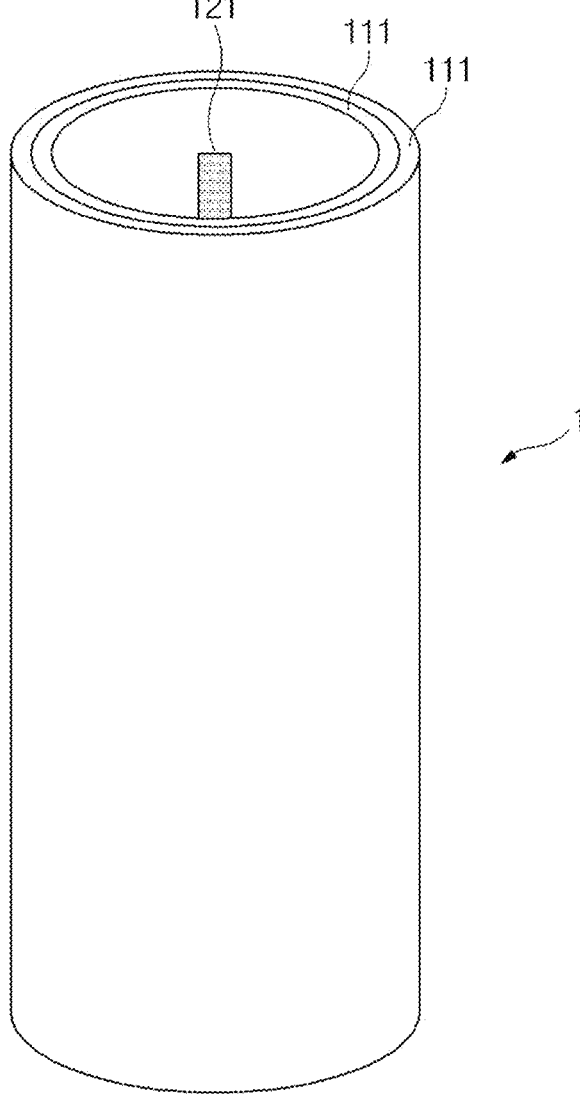
FIG. 2 is a perspective view illustrating a state in which the electrode of FIG. 1 is wound.

FIG. 1 is a development view of an electrode according to an embodiment of the present invention, and FIG. 2 is a perspective view illustrating a state in which the electrode of FIG. 1 is wound.

As illustrated in FIGS. 1 and 2, a secondary battery according to an embodiment of the present invention includes an electrode on which a coating portion 110 coated with an active material a on an electrode collector and a non-coating portion 120, on which the active material a is not applied on the electrode collector, are disposed in a longitudinal direction of the electrode collector and a notching tab part 111 extending from the coating portion 110 in a width direction of the electrode collector without being coated with the active material a and overlapping each other to form two or more layers when the electrode 100 is wound (FIG. 2 illustrates a notching tab part 111 that overlap each other to form two or more layers).

The foil tab may overlap each other to form two or more layers while forming the notching tab part that is a foil tab from electrode foil of the electrode collector, thereby increasing in mechanical strength.

The electrode 100 may be one of a positive electrode coated with a positive electrode active material and a negative electrode coated with a negative electrode active material. The electrode assembly 1 may be manufactured by stacking the positive electrode, the negative electrode, and a separator several times so that the separator is disposed between the positive electrode and the negative electrode.

Also, the electrode assembly 1 may be manufactured by winding a stack, in which the positive electrode, the separator, and the negative electrode are stacked, in a jelly-roll shape.

The positive electrode may be an aluminum electrode collector and include a positive electrode coating portion coated with the positive electrode active material and a positive electrode non-coating portion which is not coated with the positive electrode active material.

The positive electrode active material may include a lithium-containing transition metal oxide such as $LiCoO_2$, $LiNiO_2$, $LiMnO_2$, and $LiMnO_4$ or a lithium chalcogenide compound.

The positive electrode coating portion may be manufactured, for example, by applying the positive electrode active material to a portion of at least one surface of the aluminum electrode collector, and the remaining portion of the aluminum electrode collector, which is not coated with the positive electrode active material, may be the positive electrode non-coating portion.

The negative electrode may be a copper electrode collector and include a negative electrode coating portion coated with the negative electrode active material and a negative electrode non-coating portion which is not coated with the negative electrode active material.

The negative electrode active material may be a carbon material such as crystalline carbon, amorphous carbon, a carbon composite, and a carbon fiber, a lithium metal, or a lithium alloy.

The negative electrode coating portion may be manufactured, for example, by applying the negative electrode active material to a portion of at least one surface of the copper electrode collector, and the remaining portion of the copper electrode collector, which is not coated with the negative electrode active material, may be the negative electrode non-coating portion.

The separator may be manufactured by applying a polyvinylidene fluoride-hexafluoropropylene copolymer (PVDF-HFP co-polymer) to one base material selected from the group consisting of, for example, polyethylene (PE), polystyrene (PS), polypropylene (PP), and a copolymer of polyethylene (PE) and polypropylene.

As described above, the electrode 100 according to the present invention may be one of the positive electrode and the negative electrode, which constitute the electrode assembly 1. Particularly, the electrode 100 may be one, which requires further reduction in resistance, of the positive electrode and the negative electrode.

In the present invention, the negative electrode will be described as an example.

The electrode 100 has one end on which the non-coating portion 120 is formed. An electrode tab 121 may be attached to the non-coating portion 120 formed on the one end of the electrode 100.

The notching tab part 111 may be formed by notching the electrode 100 to extend from the coating portion 110 of the electrode 100 in the width direction. Only the electrode collector may be formed to extend on an area corresponding to ⅓ or more of the total length of the coating portion 110 of the electrode 100, and the active material a may not be applied.

Only the active material a may be removed from the coating portion 110 extending from the electrode 100 to form the notching tab part 111. Alternatively, only the electrode foil may extend without applying the active material a on the area of the coating portion 110 of the electrode 100 to form the notching tab part 111.

Thus, there may be an effect of forming the multi-tab while minimizing the formation of the non-coating portion, and the formation of the non-coating portion may be minimized to secure the battery capacity.

Figure 3:
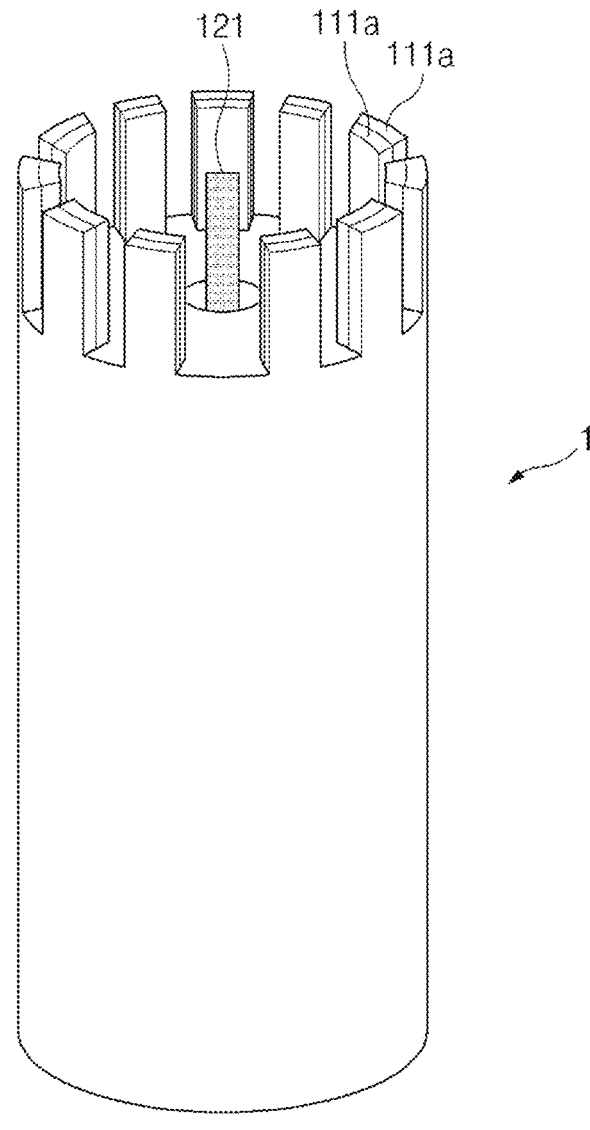
FIG. 3 is a perspective view illustrating a state in which a notching tab part is cut to form a notching tab in FIG. 2.

FIG. 3 is a perspective view illustrating a state in which the notching tab part is cut to form the notching tab in FIG. 2.

As illustrated in FIG. 3, the notching tab part 111 may be cut in the wound state to form a plurality of notching tabs 111a. When the number of notching tabs 111a increases, the electrode tab may decrease in resistance.

Here, one notching tab 111a may have a width of 4 mm to 5 mm. This is done for a reason in which, if the notching tab 111a has a width that is less than 4 mm, the mechanical strength may be weakened, and if the notching tab 111a has a width exceeding 5 mm, deformation in the process of bonding for the electrical connection with the can member may be difficult.

The notching tab 111a that is the foil tab may increase in mechanical strength to prevent the notching tab 111a from being broken in the bent state, and thus, the notching tab 111a may be bonded to the can member in the bent state to secure the reliability in electrical connection and improve the bonding performance.

Figure 4:
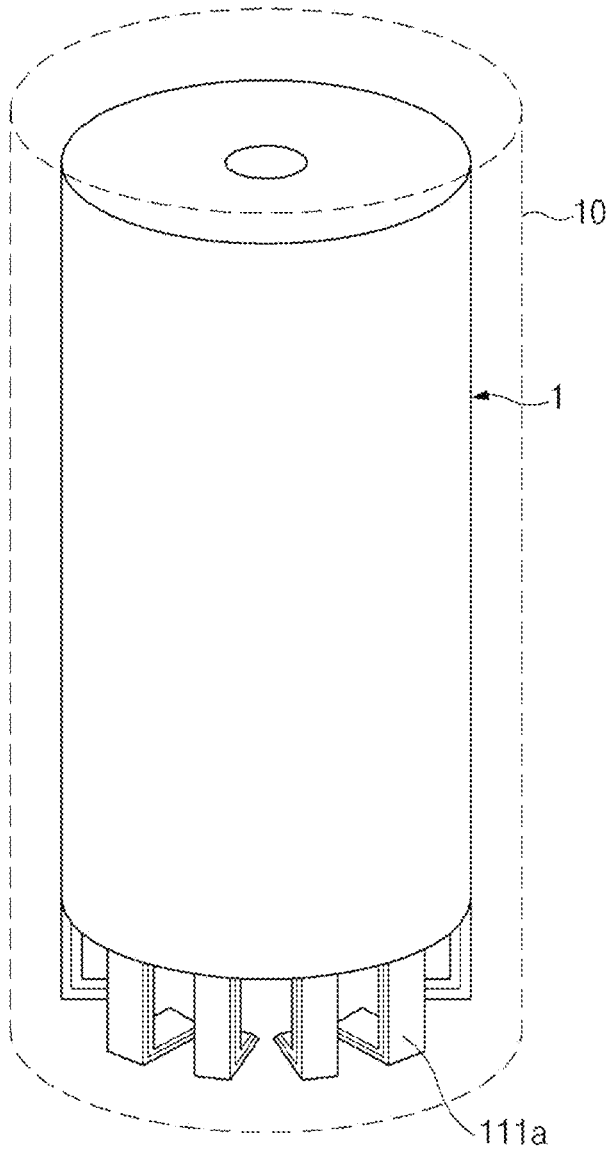
FIG. 4 is a projective perspective view when seeing through a can member in a state in which an electrode assembly is installed in the can member according to an embodiment of the present invention.
Figure 5:
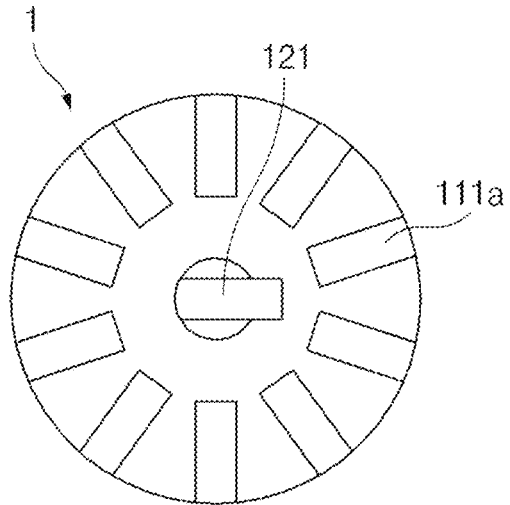
FIG. 5 is a bottom view of only the electrode assembly in FIG. 4.

FIG. 4 is a projective perspective view when seeing through the can member in a state in which the electrode assembly is installed in the can member according to an embodiment of the present invention, and FIG. 5 is a bottom view of only the electrode assembly in FIG. 4.

As illustrated in FIGS. 4 and 5, in the electrode assembly 1 of the secondary battery according to the present invention, a bent part of the notching tab 111a may be welded to be coupled to the can member 10 so that the notching tab 111a is electrically connected to the can member 10 in a state in which the notching tab 111a is bent while being accommodated in the can member 10.

The notching tab 111a may be bent to allow an end of the notching tab 111a to be coupled to a center of a bottom surface of the can member 10. Thus, the plurality of notching tabs 111a may be electrically connected to each other while the electrical connection is smooth to minimize the electric resistance.

Figure 8:
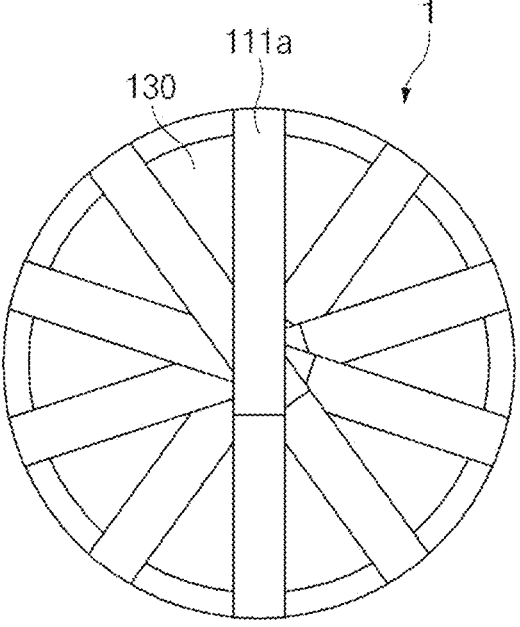
FIG. 8 is a bottom view illustrating a state in which a notching tab and an electrode tab are bonded to each other according to another embodiment of the present invention.
Figure 9:
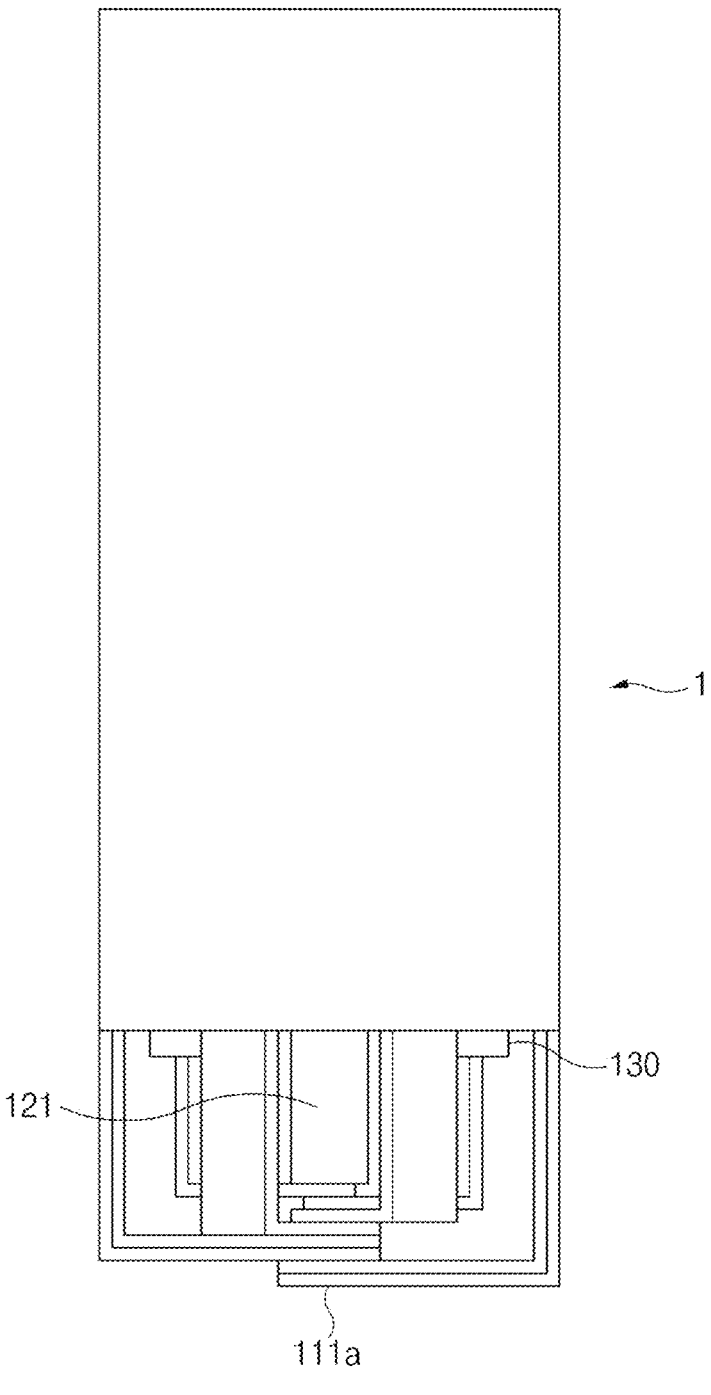
FIG. 9 is a side view of FIG. 8.

FIG. 8 is a bottom view illustrating a state in which a notching tab and an electrode tab are bonded to each other according to another embodiment of the present invention, and FIG. 9 is a side view of FIG. 8.

As illustrated in FIGS. 8 and 9, in a secondary battery according to another embodiment of the present invention, a notching tab part 111 of an electrode assembly 1, in which an electrode 100 is wound, may be cut to form a plurality of notching tabs 111a. The plurality of notching tabs 111a may be bent and then be connected to overlap an electrode tab 121 formed on a central portion of an end of the electrode assembly 1.

Also, the electrode assembly 1 may be accommodated in a can member 10, and the plurality of notching tabs 111a connected to overlap the electrode tab 121 may be bonded to the can member 10 together with the electrode tab 121 through welding.

As described above, in the secondary battery according to another embodiment of the present invention, since the plurality of notching tabs 111a and the electrode tab 121 are welded together to the can member 10 in the state in which the notching tabs 111a and the electrode tab 121 are connected to overlap each other, welding processability may be easily secured.

In the secondary battery according to another embodiment of the present invention, when an end of the electrode assembly 1 has a length ranging of 16 mm to 21 mm, a notching length of each of the plurality of notching tabs 111a may range of 8 mm to 11 mm. When the notching length of the notching tab 111a is less than 8 mm, the length of the notching tab 111a may be shortened, and the notching tab 111a may be bent. Thus, it may be difficult to allow the notching tab 111a to overlap the electrode tab 121 formed on a central portion of an end of the electrode assembly 1. Also, when the notching length of the notching tab 111a exceeds 11 mm, the length of the notching tab 111a may be unnecessarily lengthened to increase in cost due to waste of the material and in space occupied by the notching tab 111a within the can member 10. Thus, an amount of electrolyte filled into the can member 10 may be reduced to deteriorate capacity. Preferably, the notching tab 111a may have a notching length of 9 mm to 10 mm.

In the secondary battery according to another embodiment of the present invention, an insulation member 130 may be formed between a bent part of the notching tab 111a and an end of the electrode assembly 1 in which the electrode 100 is wound.

The insulation member 130 may insulate the notching tab 111a from the end of the electrode assembly 1 to prevent the notching tab 111a from coming into contact with the electrode assembly 1.

The plurality of notching tabs 111a may be formed on an outer portion of the end of the electrode assembly to prevent the insulation member 130 from interfering with the end of the electrode assembly 1.

The plurality of notching tabs 111a may be formed on the outside of the electrode assembly so that the insulation member 130 is installed between the plurality of notching tabs 111a and the end of the electrode assembly 1. Thus, the contact between the notching tab 111a and the electrode assembly 1 may be prevented to improve safety.

Hereinafter, a method of manufacturing a secondary battery according an embodiment of the present invention will be described in detail with reference to the accompanying drawings.

Figure 6:
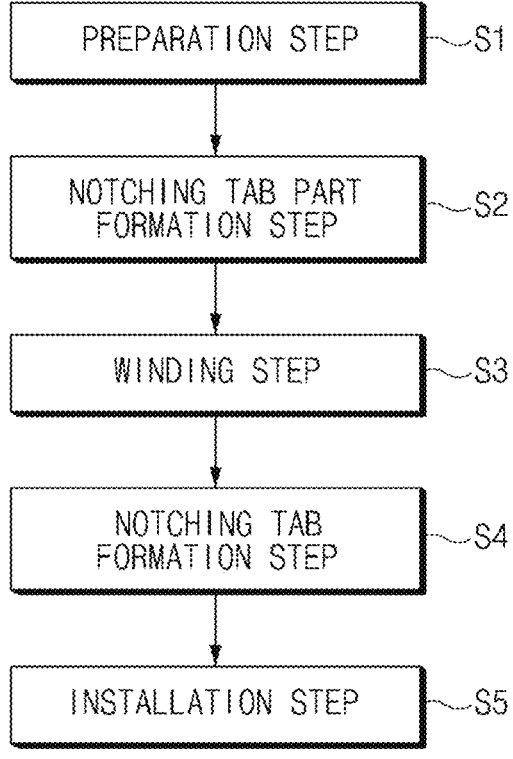
FIG. 6 is a flowchart successively illustrating a method for manufacturing a secondary battery according to an embodiment of the present invention.

FIG. 6 is a flowchart successively illustrating a method for manufacturing a secondary battery according to an embodiment of the present invention.

As illustrated in FIG. 6, a method for manufacturing a secondary battery according to an embodiment of the present invention includes a preparation step (S1), a notching tab part formation step (S2), a winding step (s3), a notching tab formation step (S4), and an installation step (S5).

The preparation step (S1) is a step of preparing an electrode 100 in which a coating portion 110 coated with an active material a on an electrode collector and a non-coating portion 120 on which the active material a is not applied are provided in a longitudinal direction of the electrode collector.

Here, the electrode 100 may be a negative electrode.

Figure 7:
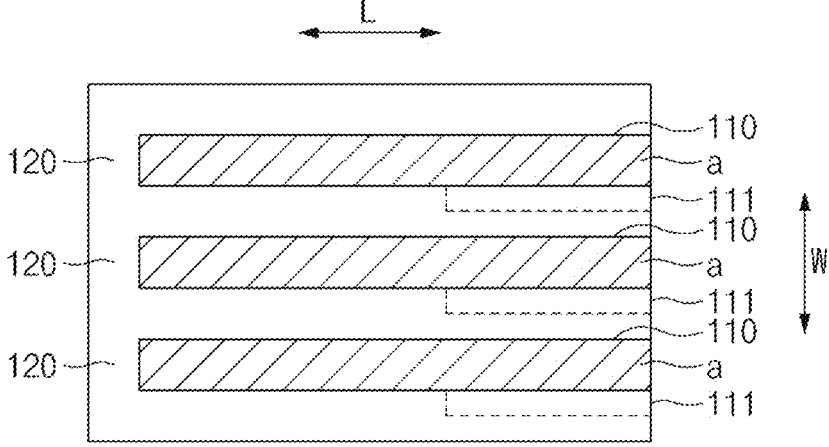
FIG. 7 is a plan view illustrating a state in which a coating portion and a non-coating portion, which are formed in a longitudinal direction of an electrode collector, are arranged in parallel to each other in a width direction of the electrode collector according to an embodiment of the present invention.

FIG. 7 is a plan view illustrating a state in which the coating portion and the non-coating portion, which are formed in the longitudinal direction of the electrode collector, are arranged in parallel to each other in a width direction of the electrode collector according to an embodiment of the present invention.

As illustrated in FIG. 7, in the preparation step (S1), the coating portion 110 and the non-coating portion 120, which are formed in a longitudinal direction L of the electrode collector may be arranged in parallel to each other in the width direction W of the electrode collector.

In the notching tab part formation step (S2) is a step of notching the electrode 10 to form a notching tab part 111 extending in a state in which the active material is not formed in the width direction W of the coating portion 111 on an area of the electrode 100 corresponding to ⅓ or more of a length of the coating portion 110.

As described above, the notching of the notching tab part 111 in the electrode 100 may a step of notching a portion of the non-coating portion on which the active material a is not applied and which is formed in the width direction W of the coating portion 11 while cutting the electrode 100 in the electrode collector to form a notch tab part 11.

Also, when the coating portion 100 and the non-coating portion 120, which are formed in the longitudinal direction L of the electrode collector, are arranged in parallel to each other in the width direction W of the electrode collector, the non-coating portion on which the active material is not applied and which is formed between one coating portion 110 and the other coating portion 110a, which are arranged in parallel to each other in the width direction W may be notched while cutting the coating portion 110 and the non-coating portion 120, which are arranged in parallel to each other to form the notching tab part 111 in the width direction W of the coating portion 110.

The winding step (S3) may be a step of stacking the electrode 100, on which the notching tab part 111 is formed, on the separator and the other electrode having a polarity different from that of the electrode 100 and winding the stack to form the electrode assembly 1.

While the electrode 100 is wound, the notching tab part 111 may overlap each other to form two or more layers.

The notching tab formation step (S4) may be a step of cutting the notching tab part 111 to form a plurality of notching tabs 111a.

The notching tabs 111*a* formed by cutting the notching tab part 111 may overlap each other to two or more layers like the notching tab part 111.

Here, the cutting of the notching tab part 111 may be maximized in work efficiency by using laser.

The insulation step (S5) may be a step of accommodating the electrode assembly 1 into the can member 10 to bond the notching tabs 111*a* to the can member 10.

In the installation step (S5), each of the notching tab 111*a* may be bent so that the welding is easily performed while the notching tab 111*a* is electrically connected to the can member 10 to allow the electrode assembly 1 to be accommodated in the can member 10 in the state in which the notching tab 111*a* is bent.

Here, since the notching tab 111*a* has the two or more layers, even though the notching tab 111*a* is bent, mechanical strength may be maintained, and thus, the notching tab may not be easily broken.

The bent notching tab 111*a* may have an end that faces a center of a bottom surface of the can member 10.

The coupling between the bottom surface of the can member 10 and the notching tab 111*a* may be performed by welding the bent part of the notching tab 111*a* to the bottom surface of the can member 10.

In addition, according to another embodiment of the present invention, the bent portions of the plurality of notching tabs 111*a* may overlap the central portion of the end of the electrode assembly 1 so as to be welded and bonded to the can member 10 together with the electrode tab 121 formed on the central portion of the end of the electrode 1 at the same time.

Although the secondary battery and the method for manufacturing the same according to the present invention has been described above with reference to the exemplary drawings, various changes and modifications may be made thereto by one skilled in the art without departing from the scope and spirit of the invention as set forth in the appended claims.

The invention claimed is:

1. An electrode assembly in a jelly-roll form, the electrode assembly having a separator disposed between a first electrode and a second electrode, the electrode assembly being wound about a winding axis along a longitudinal direction, one of the first or second electrodes comprising:

an electrode collector; and an active material coated on a coating portion of the electrode collector, wherein the electrode collector comprises a notching tab part on which the active material is not coated, the notching tab part extending from one side of the coating portion in a width direction of the electrode collector perpendicular to the longitudinal direction, the notching tab part only extending from a first end region of the coating portion in the longitudinal direction located at a radially outer portion of the jelly-roll form remote from the winding axis of the jelly-roll form in a radial direction, wherein the notching tab part has a plurality of notching tabs defined by cut portions where the notching tab part is cut, the plurality of notching tabs are arranged along the radially outer portion of the jelly-roll form such that they are spaced apart from one another in the longitudinal direction of the electrode collector by the cut portions but overlap one another in a radial direction of the jelly-roll form, and each of the plurality of notching tabs is bent radially inward to define bent parts that overlap one another in an axial direction of the jelly-roll form perpendicular to the radial direction and the circumferential direction to provide welding portions.

2. The electrode assembly of claim 1, further comprising an insulating member disposed radially inward of the plurality of notching tabs and axially inward of the bent parts of the plurality of notching tabs.

3. The electrode assembly of claim 1, wherein the bent parts of the notching tabs that are spaced apart from one another in the longitudinal direction and do not overlap one another in the radial direction are together distributed about the winding axis of the jelly-roll form.

4. The electrode assembly of claim 1, wherein the bent parts of the notching tabs that are spaced apart from one another in the longitudinal direction and do not overlap one another in the radial direction are spaced apart from the winding axis of the jelly-roll form.

5. The electrode assembly of claim 1, wherein the bent parts of the notching tabs that are spaced apart from one another in the longitudinal direction do not overlap one another in a circumferential direction of the jelly-roll form.

6. The electrode assembly of claim 1, wherein the bent parts of the notching tabs that are spaced apart from one another in the longitudinal direction overlap one another in a circumferential direction of the jelly-roll form.

7. The electrode assembly of claim 1, wherein the electrode collector further comprises a non-coating portion disposed at a second end region of the coating portion opposite the first end region in the longitudinal direction, the non-coating portion being uncoated with the active material.

8. The electrode assembly of claim 7, wherein the second end region of the coating portion is located at an inner core of the jelly-roll form, and an electrode tab is attached to the non-coating portion, the electrode tab extending further in the width direction beyond the coating portion.

9. The electrode assembly of claim 8, wherein the bent parts of the notching tabs that are spaced apart from one another in the longitudinal direction and do not overlap one another in the radial direction overlap one another and the electrode tab in the axial direction at a central portion of the jelly-roll form.

10. A secondary battery comprising:

a can member; and the electrode assembly of claim 1 accommodated in the can member, wherein the bent parts are welded to the can member.

11. The secondary battery of claim 10, further comprising an insulating member disposed radially inward of the plurality of notching tabs and axially inward of the bent parts of the plurality of notching tabs.

12. The secondary battery of claim 10, wherein the bent parts of the notching tabs that are spaced apart from one another in the longitudinal direction are together distributed about the winding axis of the jelly-roll form.

13. The secondary battery of claim 10, wherein the bent parts of the notching tabs that are spaced apart from one another in the longitudinal direction are spaced apart from the winding axis of the jelly-roll form.

14. The secondary battery of claim 10, wherein the bent parts of the notching tabs that are spaced apart from one another in the longitudinal direction do not overlap one another in a circumferential direction of the jell-roll form.

15. The secondary battery of claim 10, wherein the bent parts of the notching tabs that are spaced apart from one another in the longitudinal direction overlap one another in a circumferential direction of the jelly-roll form.

16. The secondary battery of claim 10, wherein the electrode collector further comprises a non-coating portion disposed at a second end region of the coating portion opposite the first end region in the longitudinal direction, the non-coating portion being uncoated with the active material.

17. The secondary battery of claim 16, wherein the second end region of the coating portion is located at an inner core of the jelly-roll form, and an electrode tab is attached to the non-coating portion, the electrode tab extending further in the width direction beyond the coating portion.

18. The secondary battery of claim 17, wherein the bent parts of the notching tabs that are spaced apart from one another in the longitudinal direction and do not overlap one another in the radial direction overlap one another and the electrode tab in the axial direction at a central portion of the jelly-roll form.

\* \* \* \* \*